United States Patent
Davis

(10) Patent No.: US 9,512,735 B2
(45) Date of Patent: Dec. 6, 2016

(54) SLIDING SEAL

(71) Applicant: UNITED TECHNOLOGIES CORPORATION, Farmington, CT (US)

(72) Inventor: Timothy M. Davis, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/830,795

(22) Filed: Aug. 20, 2015

(65) Prior Publication Data

US 2016/0115812 A1    Apr. 28, 2016

Related U.S. Application Data

(60) Provisional application No. 62/068,538, filed on Oct. 24, 2014.

(51) Int. Cl.
| | |
|---|---|
| *F16J 15/02* | (2006.01) |
| *F01D 11/00* | (2006.01) |
| *F16J 15/08* | (2006.01) |
| *F16J 15/10* | (2006.01) |

(52) U.S. Cl.
CPC .......... *F01D 11/005* (2013.01); *F16J 15/0887* (2013.01); *F16J 15/104* (2013.01); *F05D 2220/32* (2013.01); *F05D 2240/55* (2013.01)

(58) Field of Classification Search
CPC ...... F16J 15/061; F16J 15/0887; F16J 15/106; F16J 15/064; F16J 15/128; F16J 15/122; F01D 11/005
See application file for complete search history.

(56) References Cited

U.S. PATENT DOCUMENTS

| | | | | |
|---|---|---|---|---|
| 4,090,720 A | * | 5/1978 | Morsbach | F16J 9/203 267/1.5 |
| 4,277,047 A | * | 7/1981 | Zinnai | F16K 1/2266 251/174 |
| 4,429,885 A | * | 2/1984 | Chiba | F16J 9/068 267/1.5 |
| 4,575,099 A | * | 3/1986 | Nash | F02K 1/805 239/265.37 |
| 4,783,085 A | | 11/1988 | Wicks et al. | |
| 5,014,917 A | | 5/1991 | Sirocky et al. | |
| 5,078,412 A | * | 1/1992 | Baumgarth | F02K 1/805 239/127.1 |
| 5,185,305 A | | 2/1993 | Subramanian | |
| 7,121,790 B2 | | 10/2006 | Fokine et al. | |
| 7,347,425 B2 | | 3/2008 | James | |
| 8,651,497 B2 | | 2/2014 | Tholen et al. | |
| 2009/0243228 A1 | | 10/2009 | Heinemann et al. | |
| 2013/0113168 A1 | | 5/2013 | Lutjen et al. | |

FOREIGN PATENT DOCUMENTS

DE    1180999 B    11/1964

OTHER PUBLICATIONS

European Search Report for Application No. 15190708.6; Date of Mailing: Feb. 25, 2016.

* cited by examiner

*Primary Examiner* — Gilbert Lee
(74) *Attorney, Agent, or Firm* — Cantor Colburn LLP

(57) ABSTRACT

The present disclosure relates generally to a sliding seal between two components. At least one of the two components includes a ramped surface on which the sliding seal slides during relative movement between the two components.

20 Claims, 6 Drawing Sheets

SLIDING SEAL

CROSS REFERENCE TO RELATED APPLICATION

This application claims the benefit of and incorporates by reference herein the disclosure of U.S. Ser. No. 62/068,538, filed Oct. 24, 2014.

TECHNICAL FIELD OF THE DISCLOSURE

The present disclosure is generally related to seals and, more specifically, to a sliding seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a space defined by first and second circumferential components is disclosed, the seal comprising: a first seal section including a first base defining a ramped surface and a first leg extending from the first base, wherein an angle between the first base and the first leg comprises greater than 90 degrees; and a second seal section in sliding contact with the ramped surface; wherein the first seal section is configured to sealingly engage with the first circumferential component along a single first circumferential line of contact and to sealingly engage with the second circumferential component along a single second circumferential line of contact; and wherein the second seal section is configured to sealingly engage with the second circumferential component along a single third circumferential line of contact; and wherein the first and second seal sections are configured to move relative to one another.

In a further embodiment of the above, the second seal section includes a second base and a second leg extending from the second base, wherein the second base is in sliding contact with the ramped surface.

In a further embodiment of any of the above, the seal is formed from a material selected from one of a high-temperature metal alloy, a high-temperature ceramic fiber material, and a high-temperature ceramic fiber composite, or a combination of two or more of a high-temperature metal alloy, a high-temperature ceramic fiber material and a high-temperature ceramic fiber composite.

In a further embodiment of any of the above, a coating is applied to at least a portion of each of the first and second seal sections.

In a further embodiment of any of the above, a sheath is provided covering at least a portion of each of the first and second seal sections.

In a further embodiment of any of the above, the first and second seal sections are substantially annular.

In a further embodiment of any of the above, the first and second seal sections respectively define first and second gaps at respective opposed ends thereof.

In a further embodiment of any of the above, a bridging seal is disposed adjacent the first and second seal sections and at least partially covering the first and second gaps.

In a further embodiment of any of the above, the first and second seal sections comprise machined rings.

In a further embodiment of any of the above, the first and second seal sections comprise formed sheet metal.

In another embodiment, a system is disclosed, comprising: a first circumferential component including a first surface; a second circumferential component including a second surface, the second circumferential component disposed adjacent the first circumferential component and defining a seal cavity therebetween; and a seal disposed in the seal cavity, the seal including: a first seal section including a first base defining a ramped surface and a first leg extending from the first base, wherein an angle between the first base and the first leg comprises greater than 90 degrees; and a second seal section in sliding contact with the ramped surface; wherein the first seal section is configured to sealingly engage with the first circumferential component along a single first circumferential line of contact and to sealingly engage with the second circumferential component along a single second circumferential line of contact; and wherein the second seal section is configured to sealingly engage with the second circumferential component along a single third circumferential line of contact; and wherein pressure within the seal cavity urges the seal to seat against the first surface and the second surface; and wherein relative movement of the first component and the second component toward or away from one another causes the second seal section to slide on the ramped surface of the first seal section such that the seal is not substantially deflected.

In a further embodiment of any of the above, the second seal section includes a second base and a second leg extending from the second base, wherein the second base is in sliding contact with the ramped surface.

In a further embodiment of any of the above, the seal is formed from a material selected from one of a high-temperature metal alloy, a high-temperature ceramic fiber material, and a high-temperature ceramic fiber composite, or a combination of two or more of a high-temperature metal alloy, a high-temperature ceramic fiber material and a high-temperature ceramic fiber composite.

In a further embodiment of any of the above, a coating is applied to at least a portion of each of the first and second seal sections.

In a further embodiment of any of the above, a sheath is provided covering at least a portion of each of the first and second seal sections.

In a further embodiment of any of the above, the first and second seal sections are substantially annular.

In a further embodiment of any of the above, the first and second seal sections respectively define first and second gaps at respective opposed ends thereof.

In a further embodiment of any of the above, a bridging seal is disposed adjacent the first and second seal sections and at least partially covering the first and second gaps.

In a further embodiment of any of the above, the first and second seal sections comprise machined rings.

In a further embodiment of any of the above, the first and second seal sections comprise formed sheet metal.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
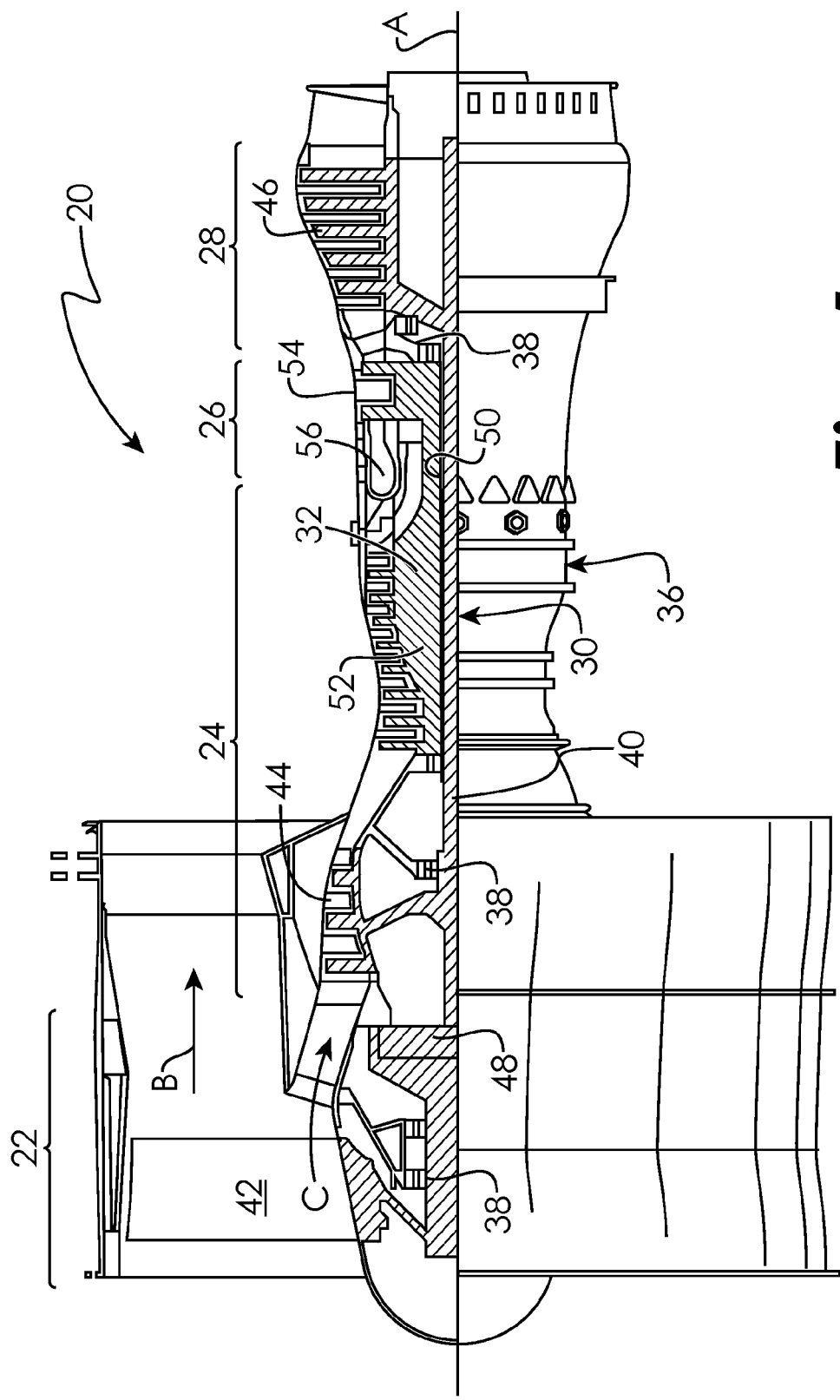
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Figure 2:
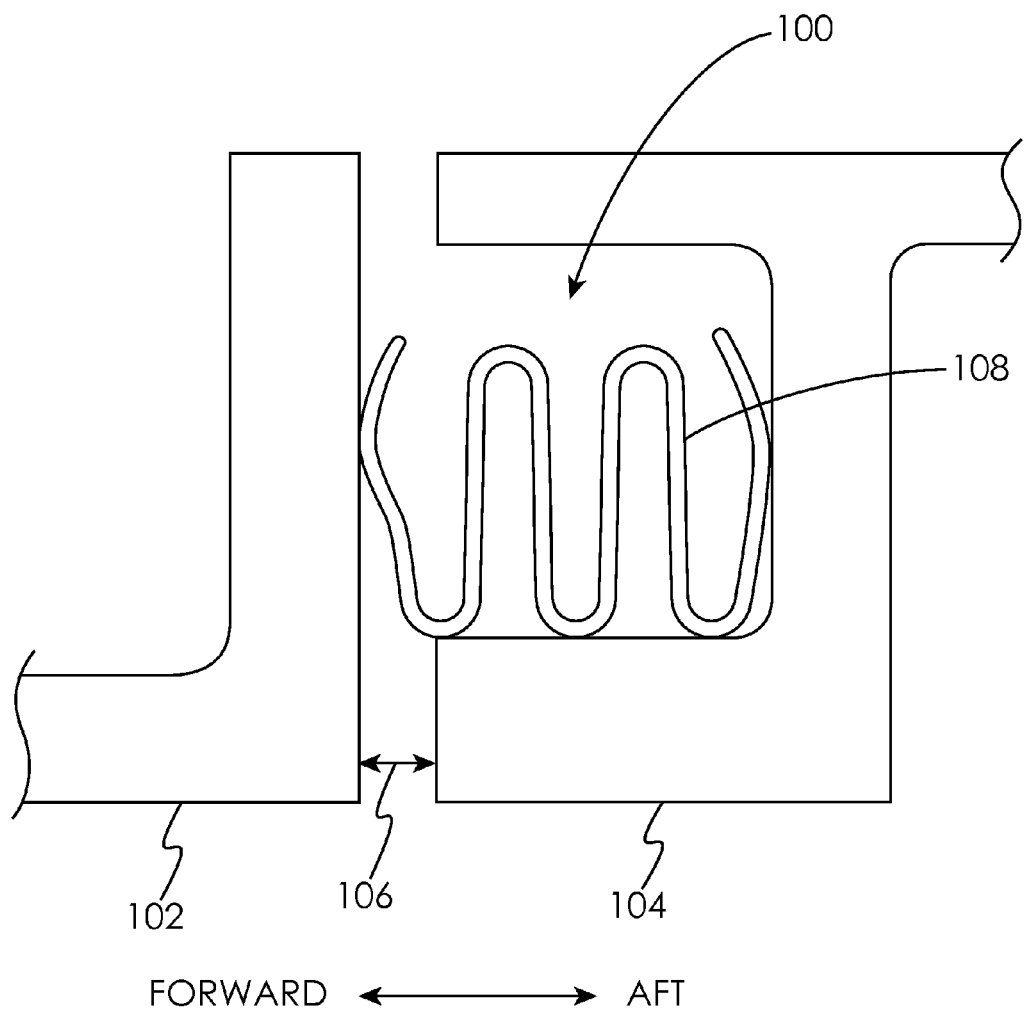
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop circumferential turbine components 102 and 104 which may move axially, radially, and/or circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies an annular w-seal 108 formed from a material appropriate to the anticipated operating conditions (e.g., deflection, temperature, pressure, etc.) of the w-seal 108, such a nickel-based alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
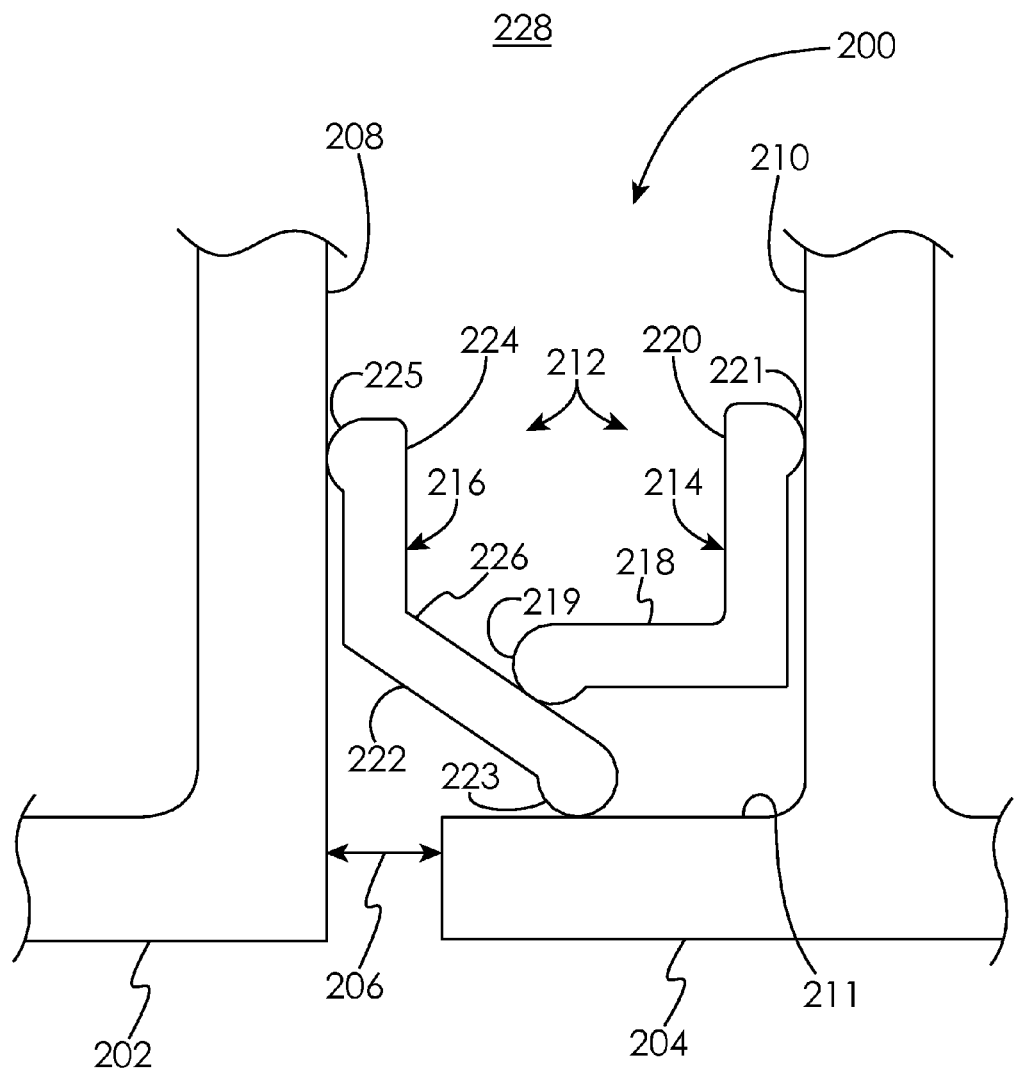
FIG. 3 is a schematic cross-sectional view of a seal and seal cavity in an embodiment.

FIG. 3 schematically illustrates a cross-sectional view of a seal cavity 200 formed by two axially-adjacent segmented or full hoop circumferential turbine components 202 and 204 which may move axially, radially, and circumferentially relative to one another about an axial centerline of the turbine engine. A nominal design clearance 206 exists between the components 202 and 204. Component 202 includes a surface 208 facing the seal cavity 200 and component 204 includes surfaces 210 and 211 facing the seal cavity 200. Within the seal cavity 200 lies a seal 212 formed from a material appropriate to the anticipated operating conditions of the seal 212, such as a high-temperature metal alloy, a high temperature ceramic material, a high temperature ceramic composite, or a combination of two or more of these, to name just a few non-limiting examples. The seal 212 is formed from a first seal section 214 and a second seal section 216. The first seal section 214 includes a base 218 and a leg 220. The second seal section 216 includes a base 222 and a leg 224. The axis of the leg 224 forms an angle of greater than 90° with the axis of the base 222 such that the base 222 includes a ramped surface 226 against which the first seal section 214 abuts. The seal 212 may include a coating and/or a sheath to provide increased wear resistance.

In an embodiment, the base 218 includes a substantially rounded end 219 in contact with the ramped surface 226 such that the base 218 contacts the ramped surface 226 along a single circumferential line of contact. As used herein, the phrase "circumferential line of contact" includes lines with a nominal radial thickness and such lines may be discontinuous (such at a location where the seal section is split). The leg 220 includes a substantially rounded end 221 in contact with the surface 210 such that the leg 220 contacts the surface 210 along a single circumferential line of contact. Thus, the seal section 214 contacts the component 204 along a single circumferential line of contact. The base 222 includes a substantially rounded end 223 in contact with the component 204 such that the base 222 contacts the component 204 along a single circumferential line of contact. The leg 224 includes a substantially rounded end 225 in contact with the surface 208 such that the leg 224 contacts the surface 208 along a single circumferential line of contact. Thus, the seal section 216 contacts the component 202 along a single circumferential line of contact and contacts the component 204 along a single circumferential line of contact.

Pressure in a secondary flow cavity 228 is transmitted to the seal cavity 200 through an opening defined by the components 202, 204. This pressure acts upon the surfaces of the seal sections 214, 216, thereby causing the base 218 to seat against the ramped surface 226 of the base 222. The legs 220 and 224 increase the piston area upon which the pressure in the secondary flow cavity 228 operates, thereby causing the seal sections 214 and 216 to significantly load (and thereby seal) against the surfaces of the components 202 and 204. The angle of the ramped surface 226 causes the seal sections 214, 216 to be biased axially away from one another, thereby causing the leg 224 to seat against the surface 208 of the component 202 and the leg 220 to seat against the surface 210 of the component 204. The load applied by base 218 to base 222 also helps base 222 to seat against the surface 211, thereby providing a secondary seal against flow that may leak past the leg 220/surface 210 interface, such as during engine start-up, for example. This prevents most or all of the secondary flow cavity 228 gases from reaching the design clearance 206 area. As the two components 202 and 204 move relative to each other in the axial and/or radial direction, the seal sections 214, 216 are free to slide relative to one another in the axial, circumferential and radial directions while the pressure forces acting upon the piston surfaces of the seal sections 214, 216 load the seal 212 so that it remains in contact with both components 202 and 204 as shown. Therefore, sealing is maintained while the components 202 and 204 and the components of the seal 212 move relative to one another. Because the seal sections 214, 216 slide with respect to one another and with respect to the components 202, 204, the seal 212 is not substantially deflected by the relative movement between the components 202 and 204 and the seal sections 214, 216 may be formed from significantly thicker material and/or a lower strength material than that used in the w-seal 108. In one embodiment, the seal sections 214, 216 may be formed as machined rings, to name just one non-limiting embodiment. In an embodiment, the seal sections 214, 216 may be formed to be undersized (as compared to the inner radial dimension of the cavity 200) in the free state to create additional inboard radial load. Such additional inboard radial load, acting upon the ramped surface 226, will also cause additional axial load, resulting in addition axial/radial load at the four sealing surfaces.

Figure 4:
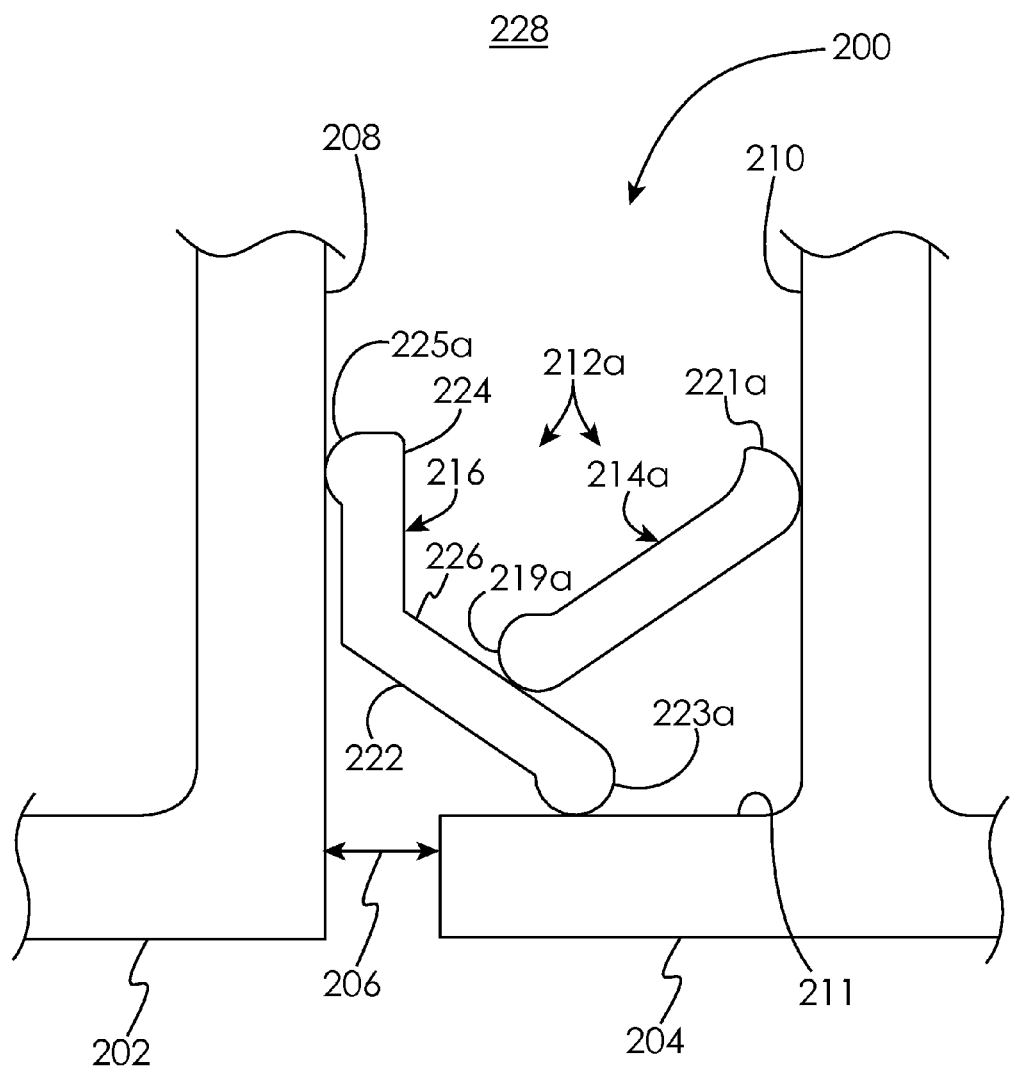
FIG. 4 is a schematic cross-sectional view of a seal and seal cavity in an embodiment.
Figure 5:
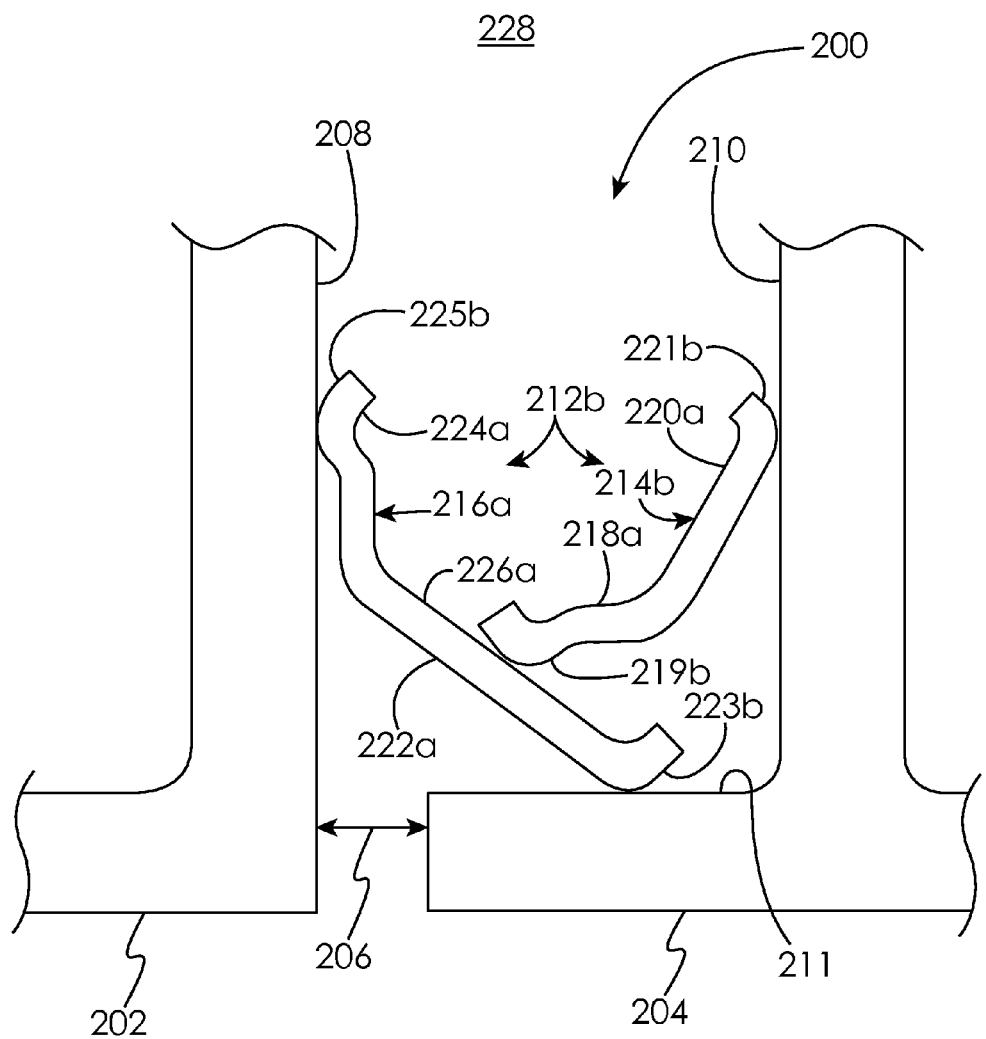
FIG. 5 is a schematic cross-sectional view of a seal and seal cavity in an embodiment.

Another embodiment of the seal 212 is illustrated in FIG. 4 and designated as 212a. The seal section 214a is not divided into a base and a leg as in the embodiment of FIG. 3. Notwithstanding this, the seal section 214a still slides upon the ramped surface 226 as relative deflection occurs between the components 202 and 204. A further embodiment of the seal 212 is illustrated in FIG. 5 and designated as 212b. The seal sections 214b and 216a are shaped to facilitate forming them from sheet metal, to name just one non-limiting example. Notwithstanding this, the seal section 214b still slides upon the ramped surface 226a as relative deflection occurs between the components 202 and 204.

Figure 6:
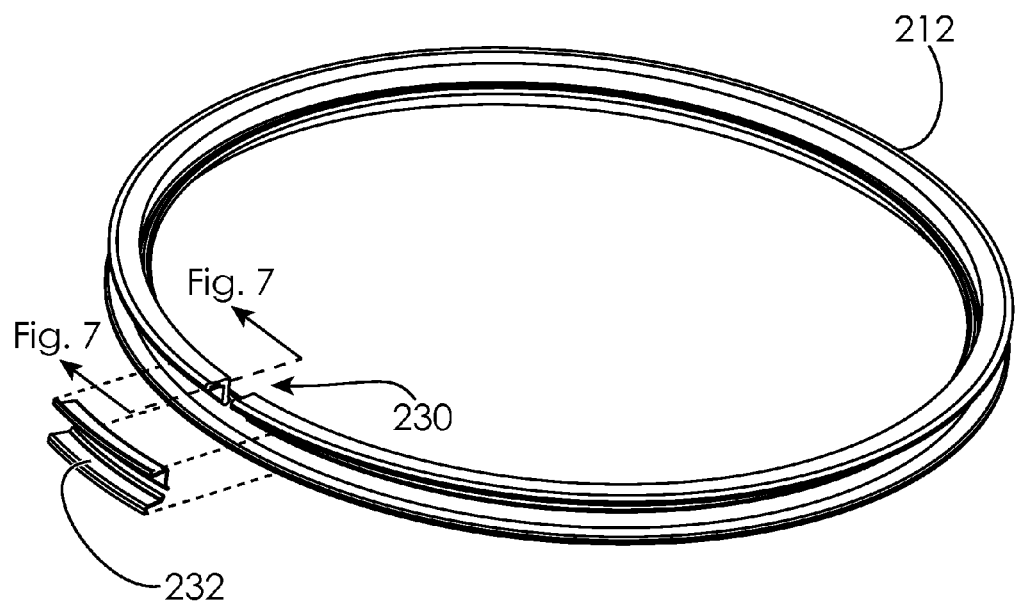
FIG. 6 is a schematic perspective view of a seal in an embodiment.
Figure 7:
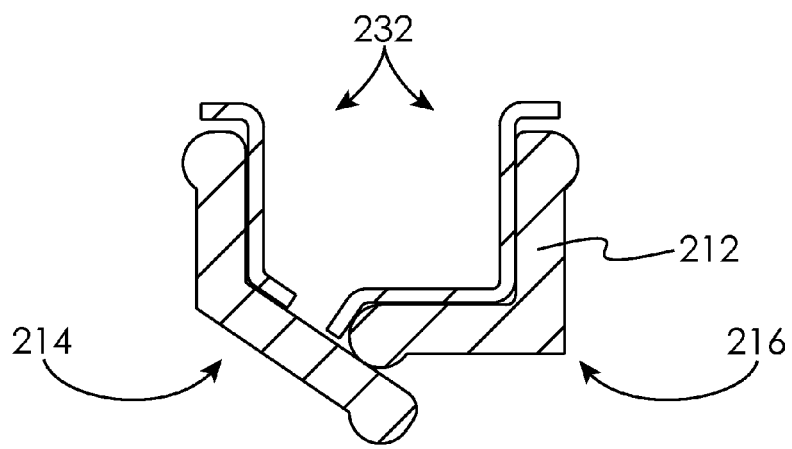
FIG. 7 is a schematic cross-sectional view of a seal and a bridging seal in an embodiment.

As shown in FIG. 6, the annular seal 212 may define a gap 230 therein to allow for expansion and contraction of the seal 212 relative to component 204. As shown in FIG. 7, the gap 230 may be partially or substantially covered by a bridging seal 232 that extends a distance on either side of the gap 230. In an embodiment, the bridging seal 232 is a discrete piece and is attached to the seal 212 on one side of the gap 230. In another embodiment, the bridging seal 232 is integrally formed with the seal 212 as an extension on one side of the gap 230. The bridging seal 232 nests within a portion of the seal 212 to bridge the gap 230, such that the bridging seal 232 seats against the seal 212 in the area of the gap 230. The pressure transmitted to the seal cavity 200 will act upon the bridging seal 232 to press in against the seal 212, thereby partially or substantially sealing the gap 230. In another embodiment, the seal section 214 is a complete full hoop (i.e., not split).

Unlike the seal 108, the seal 212 is not deflected as the components 202 and 204 move relative to each other during engine assembly and engine operation. Because of the seal 212's increased resilience due to sliding rather than flexing, the seal 212 exhibits increased durability because it is tolerant of additional axial deflection. Additionally, the seal 212 can be made from a lower strength material that may be lower cost, have higher temperature capability, be more manufacturable, and/or more wear-resistant because thicker sheet stock (or thicker machined rings) may be used and lower strength lubricious material may be used. Additionally, the seal is less susceptible to distortion or breakage, which can cause leakage of gas past the seal 212 and/or liberation of the seal. Furthermore, the seal 212 exhibits improved vibration tolerance due to friction damping. The seal 212 is also less complex/costly to produce, and the bridging seal 232 at the gap 230 will be more secure because the added stiffness of the bridging seal 232 does not impact seal functionality as it would with the seal 108 that must be deflected to seal properly. For example, providing a bridging seal to cover a gap in the seal 108 will increase the effective thickness of the seal 108 in the area of the bridging seal. Because the seal 108 must be deflected in order to seal against the surfaces of the seal cavity 100, the added thickness in the area of the bridging seal will increase the stiffness of the seal 108 in this area, reducing its ability to deflect.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a space defined by first and second circumferential components, the seal comprising:
    a first seal section including a first base defining a ramped surface and a first leg extending from the first base, wherein an angle between the first base and the first leg comprises greater than 90 degrees; and
    a second seal section in sliding contact with the ramped surface;
    wherein the first seal section is configured to sealingly engage with the first circumferential component along a single first circumferential line of contact and to sealingly engage with the second circumferential component along a single second circumferential line of contact; and
    wherein the second seal section is configured to sealingly engage with the second circumferential component along a single third circumferential line of contact; and
    wherein the first and second seal sections are configured to move relative to one another.

2. The seal of claim 1, wherein the second seal section includes a second base and a second leg extending from the second base, wherein the second base is in sliding contact with the ramped surface.

3. The seal of claim 1, wherein the seal is formed from a material selected from one of a high-temperature metal alloy, a high-temperature ceramic fiber material, and a high-temperature ceramic fiber composite, or a combination of two or more of a high-temperature metal alloy, a high-temperature ceramic fiber material and a high-temperature ceramic fiber composite.

4. The seal of claim 1, further comprising:
    a coating applied to at least a portion of each of the first and second seal sections.

5. The seal of claim 1, further comprising:
    a sheath covering at least a portion of each of the first and second seal sections.

6. The seal of claim 1, wherein:
    the first and second seal sections are substantially annular.

7. The seal of claim 6, wherein the first and second seal sections respectively define first and second gaps at respective opposed ends thereof.

8. The seal of claim 7, further comprising a bridging seal disposed adjacent the first and second seal sections and at least partially covering the first and second gaps.

9. The seal of claim 1, wherein the first and second seal sections comprise machined rings.

10. The seal of claim 1, wherein the first and second seal sections comprise formed sheet metal.

11. A system, comprising:
    a first circumferential component including a first surface;
    a second circumferential component including a second surface, the second circumferential component disposed adjacent the first circumferential component and defining a seal cavity therebetween; and
    a seal disposed in the seal cavity, the seal including:
        a first seal section including a first base defining a ramped surface and a first leg extending from the first base, wherein an angle between the first base and the first leg comprises greater than 90 degrees; and
        a second seal section in sliding contact with the ramped surface;
        wherein the first seal section is configured to sealingly engage with the first circumferential component along a single first circumferential line of contact and to sealingly engage with the second circumferential component along a single second circumferential line of contact; and
        wherein the second seal section is configured to sealingly engage with the second circumferential component along a single third circumferential line of contact; and
    wherein pressure within the seal cavity urges the seal to seat against the first surface and the second surface; and
    wherein relative movement of the first component and the second component toward or away from one another causes the second seal section to slide on the ramped surface of the first seal section such that the seal is not substantially deflected.

12. The seal of claim 11, wherein the second seal section includes a second base and a second leg extending from the second base, wherein the second base is in sliding contact with the ramped surface.

13. The seal of claim 11, wherein the seal is formed from a material selected from one of a high-temperature metal alloy, a high-temperature ceramic fiber material, and a high-temperature ceramic fiber composite, or a combination of two or more of a high-temperature metal alloy, a high-temperature ceramic fiber material and a high-temperature ceramic fiber composite.

14. The seal of claim 11, further comprising:
a coating applied to at least a portion of each of the first and second seal sections.

15. The seal of claim 11, further comprising:
a sheath covering at least a portion of each of the first and second seal sections.

16. The seal of claim 11, wherein:
the first and second seal sections are substantially annular.

17. The seal of claim 16, wherein the first and second seal sections respectively define first and second gaps at respective opposed ends thereof.

18. The seal of claim 17, further comprising a bridging seal disposed adjacent the first and second seal sections and at least partially covering the first and second gaps.

19. The seal of claim 11, wherein the first and second seal sections comprise machined rings.

20. The seal of claim 11, wherein the first and second seal sections comprise formed sheet metal.

\* \* \* \* \*